Sept. 20, 1938.     E. O. YOUNG     2,130,476
DAMPER CONTROL UNIT
Filed Aug. 14, 1936
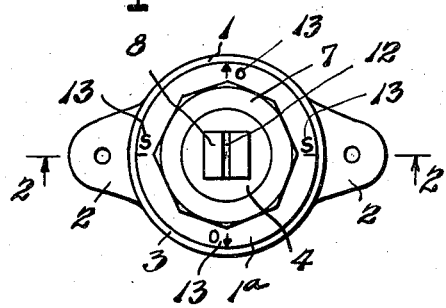
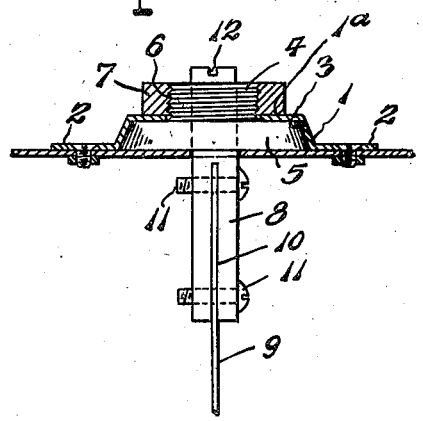
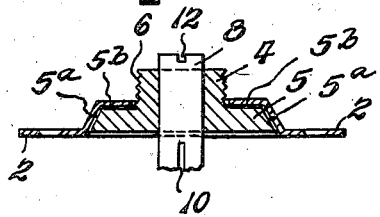
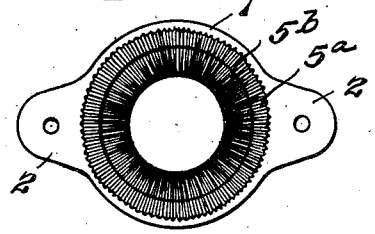
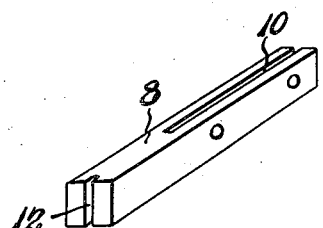
Inventor
EMIL O. YOUNG.
By Robert Robb
Attorneys Patented Sept. 20, 1938

2,130,476

UNITED STATES PATENT OFFICE 2,130,476

DAMPER CONTROL UNIT

Emil O. Young, Cleveland, Ohio

Application August 14, 1936, Serial No. 96,116

3 Claims. (Cl. 116—125)

My present invention relates to the type of damper or valve control and locking devices set forth in my Letters Patent No. 1,729,319 issued September 24, 1929, and involves primarily a simplifying of the construction of my prior invention of said patent.

The primary object in view in the design of my present valve or damper control means has been to provide not only the simplified structure previously referred to, but also the adaptability of the device to dampers or valves of air, smoke, or like flues, wherein the connection between the turning spindle member or damper rod, and the damper, is somewhat different than in my previous construction, and wherein the indicating means for denoting the position to which the damper is adjusted is likewise simplified from the standpoint of manufacture.

Other detail improvements in the invention will be understood upon reference to the following description and accompanying drawing, in which—

Figure 1 is a plan view of the damper control unit of the invention.

Figure 2 is a sectional view taken about on the line 2—2 of Figure 1.

Figure 3 is a partial sectional view of a modified embodiment of the invention.

Figure 4 is a perspective view of the damper rod and indicating member.

Figure 5 is a bottom plan view of the supporting plate of the construction, according to Figure 3.

Describing the invention specifically, my damper control unit comprises a supporting or face plate 1 having the end lugs or extensions 2 suitably apertured to receive fastenings by which the said plate is attached to the wall or flue upon which the device of the invention may be mounted. The supporting plate 1 has a central pressed out portion 3 which is provided with an aperture at the central portion thereof, through which aperture extends a sleeve 4 which carries at the inner end thereof a locking or clamping disc 5. Said sleeve projects outwardly from the outermost portion of the face or supporting plate 3 and is externally threaded at 6 to receive a lock nut 7. The sleeve 4 has a square opening therein through which, as well as through the disc 5, passes the damper actuating member or rod 8.

The purpose of the nut 7 is to move the sleeve 4 outwardly or inwardly, outwardly to cause locking or clamping action of the disc 5 against the inner surface of the supporting plate 1, and inwardly to release the clamping or locking effect above referred to.

The actuating member 8 is adapted to be turned, when the nut 7 has been partially unscrewed, to release the clamping effect of the member 5 against the member 1, and for this purpose the outer end portion of the rod or actuator 8 is preferably made of square or rectangular form so as to enable the application thereto of a wrench or suitable tool for effecting the rotation of the part 8 any desired degree to correspondingly rotate the damper or valve 9 attached thereto and located within the flue or duct in connection with which my control unit is employed.

The nut 7 has a bearing against the outer surface of the outermost portion 1a of the plate 1 in order that when the nut is screwed against the portion 1a, an outward movement may be imparted to the disc 5 for effecting its clamping action against the inner surface of the portion 1a and also against the tapering wall 3 of the plate 1, said tapering wall providing a sort of wedging effect between the parts 1 and 5 in causing the clamping action of the disc 5 against the plate 1.

The inner portion of the rod or actuating member 8 is preferably longitudinally slotted, as shown at 10, so that the blade or body of the damper or valve 9 may be received at one end in said slotted portion. Thereupon, by using the screws 11, said valve 9 may be clamped firmly in connection with the member 8. Since the plane of the damper or valve 9 is in line with the slotted portion 10 of the member 8, I provide an indicator mark or depression 12 in the outer end of the rod 8, which is in line with or parallel to the slot 10 and the plane of the damper or valve 9. By observing the position of the indicator mark 12, the position of the damper may be known. As a simple cooperating indicating means I may provide on the outermost portion 1a of the supporting or dial plate the indicia 13 in the form of the letters "O", "S", to designate the open and closed positions of the damper upon adjustment of the actuating member 8. Thus, when the indicating mark or depression 12 is aligned with the indicia "O" an open position of the damper 12 is noted, and likewise when said mark 12 is in line with the indicia "S" a shut or closed position of the damper or valve is denoted. Obviously, intermediate adjustments of the valve or damper between the open and closed positions may be correspondingly indicated by the position of the indicating mark 12 in relation to the indicia "O" and "S".

I contemplate that the disc 5 shall be of such a thickness in transverse cross section that its base or inside face may have frictional contact with the wall or a portion of the flue or duct to which the plate 1 is attached. Likewise, the outer face of said disc 5 may have frictional contact with the inner surface of the portion 1a of the plate 1. Against the peripheral edge the disc 5 may have wedging or frictional contact with the wall 3 or protuberant portion of the plate 1. Under the above conditions the disc 5 has three points of frictional contact for holding it in position in the preferred form of the invention. Notwithstanding the friction between the inner face of the disc 5 and the adjacent wall, the disc 5 is susceptible of being turned by a tool or wrench applied to the outer end of the member 8, because this end portion is of square formation and passes through an opening of like form provided in the sleeve 4 and the disc 5. The above turning of the disc against the friction at its inner face can be performed, however, only after the nut 7 is unscrewed slightly to relieve the friction between the edge of the disc and the part 3 of the plate 1, and between the outer face of the disc 5 and the inner face of that portion of the plate with which it engages.

The operation of my invention according to the foregoing construction is simple, and the formation of the parts making up the device is likewise simple and susceptible of being cheaply manufactured.

With the parts in their position of Figure 1 and assuming that the damper 9 is locked or fixed in its adjustment by the control unit, if it is desired to turn the damper the screw 7 is slightly unscrewed and the friction between the outer face of the disc 5 and the edges of the disc 5 and the plate 1 is relieved. Thereupon, a tool is applied to the outer projecting rectangular end of the member 8 to enable it to be turned as far as desired toward and from open and closed positions. The indicator 12 will indicate the proper position of the damper 9, and after the adjustment has been made, the screw 7 is tightened by screwing in the direction of the plate.

According to the construction in Figure 3, there may be provided between the peripheral edge of the disc 5 and the adjacent wall of the plate 1 slight serrations or roughened portions 5a to facilitate the clamping or locking effect of the disc 5 when pulled against the plate 1. And likewise there may be provided similar serrations or roughened portions between the outer surface of the disc 5 at 5b and the adjacent inner surface of the portion 3 of the plate 1, all with a view to maintaining the disc 5 in a locked condition when the screw 7 is tightened. Under these conditions of the provision of the said serrated or roughened portions, the disc 5 will be of more shallow construction in the depth dimension thereof, so as to allow a slight movement inwardly and outwardly of the disc when locking and unlocking the same, respectively, to correspondingly lock the sleeve 4 and the member 8. Figure 3 illustrates such construction in which, therefore, there will be no friction between the inner face of the disc 5 and the adjacent portion of the flue or wall against which the plate 1 is mounted.

The operation of the invention, according to Figure 3, is substantially the same as previously set forth, excepting that in the normal position of the disc 5 when locked there is no friction of its inner surface against the adjacent wall or portion of the flue to which the plate 1 is attached.

It will be understood that in lieu of the indicator mark 12 at the outer end of the member 8, this may be provided with a narrow dimension in line with the slotted portion 10, and such narrow dimension will act as indicator of the position of the damper 9, dependent upon its adjustment.

It will be understood that I am not limited to any particular type of damper actuator or rod 8 because my control device may be employed with different kinds of such parts, long, short, and of different cross sections, such as square, round, etc. Also, the indicia for denoting the position of the damper by the position of the actuating member 8 may take a diversity of forms within the purview of the invention.

Having thus described my invention, what I claim as new and desire to secure by Letters Patent of the United States, is—

1. A damper control unit of the class described, comprising a supporting plate having means for attaching the same adjacent to the damper of a flue and provided with a central opening, a sleeve passing through the said opening of the supporting plate and provided with a locking disc connected therewith to move with the same, said locking disc bearing against the inner surface of the plate and said sleeve projecting from the outer surface of the plate, an adjusting nut threaded upon the sleeve at the portion thereof projecting from the plate and disposed on the outer side of the plate, and a damper actuating member comprising a rod which passes through the sleeve and the disc connected therewith and has interlocking relation with respect to said members to rotate therewith, said actuating member having means at its inner end for interconnecting same with a damper or valve and said actuating member at its outer end having indicating means to indicate the adjustment thereof relatively to the supporting plate and correspondingly indicate the adjustment of a damper or valve which may be connected to said actuating member, the said supporting plate having a pressed out portion providing an outer wall and side walls, in which portion is mounted the disc, said disc being of less thickness from its outer surface to its inner surface than the depth of the said protuberant portion, whereby slight inward and outward movement of the disc in the protuberant portion may be effected, the inner surface of the protuberant portion at its side walls and outer portions being roughened or serrated, and the corresponding adjacent portion of the disc being similarly formed, the walls of said protuberant portion and the peripheral edge of said disc being correspondingly tapered whereby said disc may engage said plate with wedging and interlocking effect when the nut of the sleeve is adjusted to move the sleeve outwardly with the disc.

2. A damper control unit of the class described, comprising a supporting plate having means for attaching the same adjacent to the damper of a flue and provided with a central opening, an integral sleeve and locking disc member the sleeve portion of which passes through said opening and the locking disc portion of which is positioned inwardly of said plate, an adjusting nut threaded upon the sleeve at the portion thereof projecting from the plate and disposed on the outer side of said plate and adapted to adjust the sleeve and locking disc member relatively to the plate, said plate having a pressed out protuberant portion with which the peripheral edge of the disc portion and the outer surface thereof may frictionally engage upon adjustment of said adjusting nut, the walls of said pressed out protuberant portion of said plate and the peripheral edge of said disc being correspondingly tapered whereby said disc may engage the plate with tight wedging effect upon adjustment of said nut inwardly of said sleeve to thereby prevent unauthorized movement of said disc relative to said plate when so engaged.

3. A damper control unit of the class described, comprising a supporting plate having means for attaching the same adjacent to the damper of a flue and provided with a central opening, an integral sleeve and locking disc member the sleeve portion of which passes through said opening and the locking disc portion of which is positioned inwardly of said plate, an adjusting nut threaded upon the sleeve at the portion thereof projecting from the plate and disposed on the outer side of said plate and adapted to adjust the sleeve and locking disc member relatively to the plate, said plate having a pressed out protuberant portion with which the peripheral edge of the disc portion and the outer surface thereof may frictionally engage upon adjustment of said adjusting nut, the walls of said pressed-out protuberant portion of said plate and the peripheral edge of said disc being correspondingly tapered and said disc and the inner portion of said plate being serrated, whereby, upon adjustment of said nut inwardly of said sleeve, said disc may engage the plate with interlocking and wedging effect, and a damper actuating member connected with said sleeve to turn therewith and passing substantially therethrough, said actuating member having means at its inner end for interconnecting same with a damper or valve and said actuating member at its outer end having indicating means to indicate the adjustment thereof relatively to the supporting plate and correspondingly indicate the adjustment of a damper or valve which may be connected to said actuating member.

EMIL O. YOUNG.